(12) United States Patent
Ruppel et al.

(10) Patent No.: US 9,598,992 B2
(45) Date of Patent: Mar. 21, 2017

(54) SEPARATION DEVICE FOR AN AEROSOL STREAM

(71) Applicant: Mahle International GmbH, Stuttgart (DE)

(72) Inventors: Stefan Ruppel, Heidelberg Emmertsgrund (DE); Julius Aktas, Bietigheim-Bissingen (DE); Yakup Oezkaya, Kornwestheim (DE); Leszek Goerlich, Leonberg (DE); Ulrich Wiesner, Waiblingen (DE); Jan Scheffel, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/653,264

(22) PCT Filed: Dec. 17, 2013

(86) PCT No.: PCT/EP2013/076821
§ 371 (c)(1),
(2) Date: Jun. 17, 2015

(87) PCT Pub. No.: WO2014/095801
PCT Pub. Date: Jun. 26, 2014

(65) Prior Publication Data
US 2015/0337698 A1    Nov. 26, 2015

(30) Foreign Application Priority Data

Dec. 18, 2012   (DE) .................. 10 2012 223 643

(51) Int. Cl.
*F01M 13/00*    (2006.01)
*F01M 13/04*    (2006.01)
(Continued)

(52) U.S. Cl.
CPC ......... *F01M 13/04* (2013.01); *B01D 46/0005* (2013.01); *B01D 46/543* (2013.01);
(Continued)

(58) Field of Classification Search
CPC ........... F01M 13/04; F01M 2013/0433; F01M 2013/0438; F01M 13/0416
(Continued)

(56) References Cited

U.S. PATENT DOCUMENTS 4,627,406 A * 12/1986 Namiki .................. F01M 13/04
                                                                123/572
6,409,805 B1    6/2002 Beier et al.
(Continued)

FOREIGN PATENT DOCUMENTS

DE    202005018435 U1    2/2006
DE    202008008035 U1    9/2008
(Continued)

OTHER PUBLICATIONS

English abstract for DE-102010029322.
(Continued)

*Primary Examiner* — Marguerite McMahon
*Assistant Examiner* — James Kim
(74) *Attorney, Agent, or Firm* — Fishman Stewart PLLC

(57) ABSTRACT

A separation device for separating contaminates from a gas flow may include a raw chamber receiving a contaminated gas and a clean chamber out of which a treated gas exits. A dividing wall may separate the raw chamber from the clean chamber. The dividing wall may include a perforated region defining a plurality of passage openings. The gas flow may be communicated from the raw chamber to the clean chamber via the plurality of passage openings. A gas-permeable separation structure may be arranged on a wall outlet side of the dividing wall facing the clean chamber. The separation
(Continued)

structure may separate contaminates from the gas flow when subjected to a through flow.

17 Claims, 2 Drawing Sheets

(51) Int. Cl.
*B01D 46/00* (2006.01)
*B01D 46/54* (2006.01)
*F02F 1/24* (2006.01)
(52) U.S. Cl.
CPC ....... *F02F 1/24* (2013.01); *F01M 2013/0433* (2013.01); *F01M 2013/0438* (2013.01)
(58) Field of Classification Search
USPC ...................................... 123/572–574, 41.86
See application file for complete search history.

(56) References Cited

U.S. PATENT DOCUMENTS

| | | | |
|---|---|---|---|
| 6,923,911 B1 * | 8/2005 | Beier | B01D 29/012 210/273 |
| 7,631,639 B2 * | 12/2009 | Yonebayashi | F01M 13/0416 123/572 |
| 7,857,883 B2 * | 12/2010 | Scheckel | B01D 45/08 55/445 |
| 8,252,079 B2 * | 8/2012 | Gruhler | B29C 65/58 55/320 |
| 9,458,804 B2 | 10/2016 | Chiga | |
| 2009/0250044 A1 * | 10/2009 | Braun | B01D 45/06 123/573 |
| 2011/0179755 A1 | 7/2011 | Gruhler et al. | |
| 2012/0159912 A1 | 6/2012 | Ruppel | |

FOREIGN PATENT DOCUMENTS

| | | |
|---|---|---|
| DE | 102008050039 A1 | 2/2010 |
| DE | 102009024701 A1 | 12/2010 |
| DE | 102010029322 A1 | 12/2011 |
| JP | S60-84714 | 6/1985 |
| JP | S62169212 U | 10/1987 |
| JP | 2010-032831 A | 2/2010 |
| WO | WO-2010017903 A1 | 2/2010 |

OTHER PUBLICATIONS

English Abstract for JP2010032831A.
English Translation of Japanese Office Action for Patent App. No. 2015-548429.
Bibliographic Data Sheet indicating Abstract Not Available for JPS62169212U.
European Search Report for EP-13808004.9, Jan. 2, 2017.

* cited by examiner

SEPARATION DEVICE FOR AN AEROSOL STREAM

CROSS-REFERENCE TO RELATED APPLICATIONS

This application claims priority to German Patent Application No. 10 2012 223 643.0, filed Dec. 18, 2012, and International Patent Application No. PCT/EP2013/076821, filed Dec. 17, 2013, both of which are hereby incorporated by reference in their entirety.

TECHNICAL FIELD

The present invention relates to a separation device for separating solid and/or liquid particles from a gas stream. The invention additionally relates to a blow-by gas cleaning device for separating oil and soot particles out of a blow-by gas stream, which comprises at least on such separation device. The invention furthermore relates to a crankcase ventilation device for an internal combustion engine, in particular of a motor vehicle, which is equipped with at least one such separation device. Finally, the present invention relates to a cylinder head cover for an internal combustion engine, in particular of a motor vehicle, in which at least one such separation device is integrated.

BACKGROUND

From WO 2010/017903 A1 a separation device for separating solid and/or liquid particles out of a gas flow is known, which is employed with an internal combustion engine in order to separate oil particles and soot particles out of a blow-by gas stream. The known separation device comprises in an upper part of a valve cover a raw chamber, which the contaminated blow-by gas enters, a clean chamber, out of which the cleaned blow-by gas exits, and a separating wall, which divides the raw chamber from the clean chamber. The separating wall is formed as a perforated plate so that it comprises a perforated region with multiple passage openings through which the gas from the raw chamber can flow into the clean chamber. On a wall outlet side of the separating wall facing the clean chamber, a gas-permeable separation structure of a fibre fleece covering the perforated region is arranged, which, when subjected to a through-flow, separates the particles out of the gas flow. In the case of the known separation device, a baffle wall is additionally provided, which is arranged on an outside of the separation structure facing away from the separating wall. The baffle wall is designed gas-impermeably. In the known separation device, a flow guiding structure is additionally formed on the wall outlet side of the dividing wall, which projects from the separating wall in the direction of the baffle wall. The separation structure in this case is clamped in between the baffle wall and the free ends of the flow guiding structure so that the separation structure on the one hand abuts the baffle wall and on the other hand the face ends of the flow guiding structure under preload. With the known separation device, an impactor with baffle wall is thus realised. For fixing the separation structure, pins can also project from the flow guiding structure which engage in the separation structure.

In contrast with a filter, a pure impactor is not generally subjected to a through-flow. The separation effect for solid or liquid contaminations carried along in the flow is not based on a defined pore size as with a filter but on an abrupt flow deflection and concomitant inertia effects. The separation structure is not intended to filter the contaminations out of the gas stream but only absorb and discharge if applicable the contaminations decelerated through inertia effects. For the efficiency of the particle separation of such an impactor adhering to a predetermined spacing between perforated region and baffle plate is of increased importance. Because of manufacturing tolerances, however, this spacing can vary comparatively greatly. At the same time, the compression of the separation structure with the known separation device is correspondingly varied also because of this, as a result of which the separation effect of the separation structure is also influenced. It is likewise possible in principle that the compression of the separation structure between separating wall and baffle wall because of the tolerances becomes so slight that the desired position fixing for the separation structure cannot be ensured. In addition, the preferably precise adjustment of a predetermined spacing between the perforated region and the separation structure can also have decisive influence on the achievable separation effect of the impactor.

From DE 10 2010 029 322 A1 it is known to provide openings in a valve member of a bypass valve and to cover these with a separation structure. At least with closed valve member, the openings can be subjected to a through-flow, upon which the separation structure then exhibits a certain filtering effect.

Further separation structures subjected to through-flow and consequently mainly acting as filters are known from U.S. Pat. No. 6,409,805 B1 and U.S. Pat. No. 4,627,406.

SUMMARY

The present invention deals with the problem of stating an improved embodiment for a separation device of the type mentioned at the outset and for a crankcase ventilation device equipped with such, a cylinder head cover equipped with such and a blow-by gas cleaning device equipped with such, which is characterized in particular by an improved fixing and/or positioning of the separation structure relative to the passage openings of the perforated region.

According to the invention, this problem is solved through the subject of the independent claim. Advantageous embodiments are subject of the dependent claims.

The invention is based on the general idea of fastening the separation structure directly on the dividing wall. Because of this, the relative position between dividing wall and separation structure can be realised independently of a possible tolerance-affected relative position between the dividing wall and a baffle wall if present. Accordingly, a desired relative position between dividing wall and separation structure can be more easily established with relatively close tolerance.

With a preferred embodiment, the separation structure can be exclusively fastened to the dividing wall. Accordingly, additional fastening measures and fastening elements located outside the dividing wall can be omitted. In particular, no baffle wall is required for fastening the separation structure to the dividing wall.

According to a further advantageous embodiment, the separation structure can be arranged standing freely in the clean chamber. In particular, a structure outlet side of the separation structure facing away from the dividing wall can be arranged standing freely in the clean chamber. This means that the separation structure at least with its structure outlet side, except for its lateral edge, does not have any contact with a further component. In particular, there is no contact with a baffle wall that may be present if applicable.

Thus, a tolerance-affected relative position between dividing wall and a baffle wall that may be present if applicable cannot have an effect on the compression of the separation structure.

According to another particularly advantageous embodiment it can be provided that on a structure outlet side of the separation structure facing away from the dividing wall no baffle wall is arranged in the clean chamber. In other words, the separation device introduced here omits a baffle wall for forming a conventional impactor which is always characterized by a baffle wall. By omitting such a baffle wall, only the separation structure is effective for separating the particles out of the gas stream. Here, the separation structure works comparably to a filter structure. Since however the gas flow with the help of the passage openings is reduced to comparatively small flow cross sections, relatively high flow velocities are also obtained here within the respective passage openings so that the contaminated gas flow impacts the separation structure with high velocity. As a consequence, the separation structure additionally acts also as baffle area and not only as pure filter structure. In this way, the separation effects of an impactor on the one hand and of a filter on the other hand are combined in the separation structure subjected to onflow via the discrete passage openings.

Particularly advantageous is an embodiment, in which the separation structure is welded to the dividing wall. Such welding methods can be realised in a particularly simple and process-reliable manner such that on the one hand undesirable compression of the separation structure can be avoided or a predetermined compression of the separation structure can be maintained and that on the other hand a predetermined relative position between separation structure and dividing wall can be achieved.

According to an advantageous further development, the dividing wall can comprise welding ribs which can be in particular integrally formed on the dividing wall. With the help of these welding ribs, the separation structure can now be welded to the dividing wall particularly easily. This means that the welded connection between the separation structure and the dividing wall is effected by way of multiple welds which are arranged on the welding ribs. In particular, a deformation of the dividing wall during the welding process can thereby be avoided on the one hand, while on the other hand it is possible with the help of such welding ribs to provide spacing between the wall outlet side and a structure inlet side of the separation structure facing the dividing wall. Here, a predetermined spacing between the wall outlet side and the structure inlet side can be maintained relatively precisely. The welding ribs in this case project from the dividing wall on the wall outlet side in the direction of the clean chamber.

According to an advantageous embodiment, the welding ribs can project into the separation structure. In particular, the welding ribs can dip into the separation structure during the welding process. Because of this, stiffening or stabilisation of the separation structure through the welding ribs embedded therein is obtained.

Practically, the welding ribs are produced from plastic. Likewise, the separation structure preferentially consists of a plastic. For example, the separation structure is a fibre fleece of plastic fibres.

With another further development it can be provided that the welding ribs project or dip into the separation structure only so far that they do not penetrate the separation structure. In other words, the welding ribs end with their free ends distal from the dividing wall within the separation structure.

In particular, an embodiment can thereby be realised particularly easily with which the welding between the separation structure and the welding ribs preferably takes place on the free ends of the welding ribs. Because of this, the welded connection can be produced comparatively cost-effectively.

In another advantageous embodiment, the dividing wall can comprise multiple guide elements laterally surrounding the perforated region, between which the separation structure is arranged. Here, the guide elements are arranged on the wall outlet side and project from the dividing wall in the direction of the clean chamber. Because of this, the separation structure is given lateral support.

According to another advantageous embodiment, the passage openings on the wall outlet side can each be surrounded by a collar which projects from the dividing wall in the direction of the clean chamber. With the help of such a collar the length of the associated passage opening can be increased, as a result of which the gas flow flowing through the respective passage opening is given an improved orientation and accordingly can impact on the separation structure in a more concentrated manner which improves its separation effect.

According to an advantageous further development, a structure inlet side of the separation structure facing the dividing wall can be spaced from freestanding face ends of the collars. Because of this, a predetermined preferentially relatively small spacing between the structure inlet side and the freestanding face ends of the collars can be realised. Since the separation structure is fixed on the dividing wall a predetermined spacing between structure inlet side and freestanding face ends of the collars can be adjusted during the fixing, upon which comparatively close tolerances can be maintained.

Through the spacing between the structure inlet side and the freestanding face ends of the collars the through-flow resistance of the separation device can be significantly reduced since the individual concentrated gas flows formed through the passage opening can partially bounce off the structure inlet side and deviate laterally.

The spacing between the structure inlet side and the freestanding face ends of the collars can preferentially be smaller than a diameter of such a passage opening. Practically, the freestanding face ends of the collars lie in a common plane so that throughout the perforated region a constant spacing between the face ends of the collars and the structure inlet side can be maintained. Practically, all passage openings have same diameters in a cross-sectional plane. In particular, the passage openings can have circular cross sections.

With another embodiment it can be provided that the separation structure directly abuts the freestanding face ends of the collars so that the abovementioned spacing is not present or its value is zero. In this case, the individual gas flows of the passage openings completely enter into the depth of the separation structure.

In another embodiment it can be provided that the passage openings directly end on the flat configured wall outlet side, i.e. close off flush with the same. Accordingly, no collars of the type described above are present. In this case it is also possible to arrange the separation structure with its structure inlet side spaced relative to the wall outlet side, wherein a predetermined, preferentially small spacing can be relatively easily maintained here as well. Alternatively, the separation structure can also be arranged without such spacing on the dividing wall so that the wall outlet side directly abuts the structure inlet side.

In order to additionally increase the flow velocity of the gas flow in the passage openings, the passage openings can be configured as nozzles which are characterized by a flow cross section that decreases in their through-flow direction. This nozzle contour can extend over the entire length of the passage openings including the existing, if appropriate, collars. It is likewise possible to provide this converging nozzle contour only within the dividing wall or only within the collars.

A crankcase ventilation device according to the invention, which is employed with an internal combustion engine, preferentially of a motor vehicle, comprises a blow-by gas path which fluidically connects a crankcase of the internal combustion engine with a fresh air system of the internal combustion engine. Here, this blow-by gas path can partially run also within an engine block and for example lead through a cylinder head cover of the internal combustion engine. The fresh air system supplies the internal combustion engine with fresh air in the usual manner. Thus, the blow-by gas path ensures that the blow-by gas does not enter the environment but is fed to the combustion process of the internal combustion engine. In order to reduce the oil consumption of the internal combustion engine in the process, at least one separation device of the type explained at the outset is arranged in this blow-by gas path. Accordingly, only cleaned blow-by gas enters the fresh air system.

A cylinder head cover according to the invention, with the help of which a cylinder head of an engine block of the internal combustion engine can be covered, comprises a cover body and at least one separation device of the type explained above. The cover body in this case can be shaped so that it bounds at least one part of the raw chamber and at least one part of the clean chamber of the separation device. Furthermore, the dividing wall of the separation device is arranged on the cover body, i.e. either fastened thereon in the form of a separate component or integrally formed thereon.

A blow-by gas cleaning device according to the invention, with the help of which oil particles and soot particles can be separated out of a blow-by gas stream, is characterized by at least one separation device of the type described above.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference numbers relate to same or similar or functionally same components.

It shows, in each case schematically.

DETAILED DESCRIPTION

Figure 1:
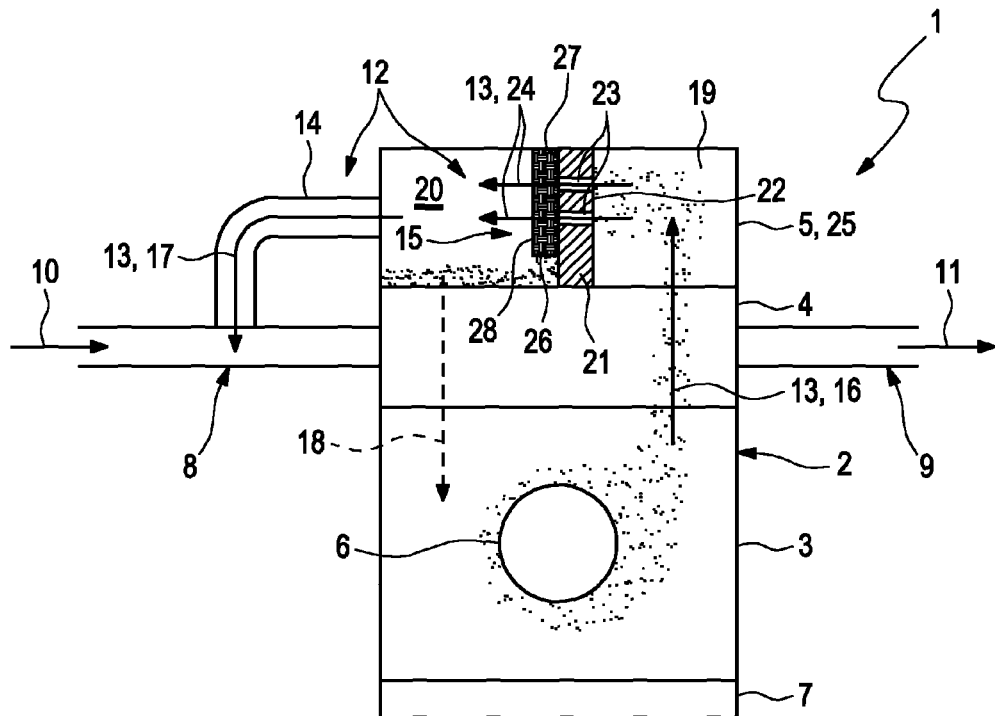
FIG. 1 a greatly simplified sectional representation in the manner of a circuit diagram of an internal combustion engine with a crankcase ventilation device, FIG. 2 an isometric view of a dividing wall in the region of a separation structure, FIG. 3 a lateral view of the dividing wall in the region of the separation structure, FIG. 4 an isometric expanded view of the dividing wall in the region of the separation structure.

According to FIG. 1, an internal combustion engine 1, which can be arranged in a stationary installation or in a mobile installation, such as for example a motor vehicle, comprises an engine block 2, which in the usual manner comprises a crankcase 3, a cylinder head 4 and a cylinder head cover 5. In the crankcase 3, a crankshaft 6 rotates. Furthermore, an oil sump 7 can be present in the crankcase 3. The crankshaft 6 is drive-connected in the usual manner with pistons which are not shown here, which are stroke-adjustably arranged in cylinders which are likewise not shown. The cylinder head 4 usually contains gas exchange valves which are not shown and a valve drive for controlling the gas exchange valves which is likewise not shown. Furthermore, ignition devices which are not shown and fuel injection nozzles which are not shown can also be arranged in the cylinder head 4. The cylinder cover 5 covers the cylinder head 4 on a side facing away from the crankcase 3.

The internal combustion engine 1 furthermore is equipped in the usual manner with a fresh air system 8 for feeding fresh air to the combustion chambers, that is to the cylinders of the internal combustion engine 1 and with an exhaust system 9, with the help of which combustion exhaust gases are discharged from the combustion chambers. A fresh air flow 10 is indicated by an arrow, likewise an exhaust gas flow 11.

The internal combustion engine 1 is additionally equipped with a crankcase ventilation device 12, which comprises a blow-by gas path 13, which is indicated by arrows in FIG. 1. This blow-by gas path 13 creates a fluidic connection between the crankcase 3 and the fresh air system 8. In the example of FIG. 1, the blow-by gas path 13 leads from the crankcase 3 through the cylinder head 4 into the cylinder head cover 5 and from there via a return line 14 to the fresh air system 8. The crankcase ventilation device 12 additionally comprises at least one separation device 15, which is arranged in the blow-by gas path 13. This separation device 15 is designed as blow-by gas cleaning device, so that it is able to separate oil particles and soot particles carried along in the blow-by gas out of the blow-by gas stream. Here, the separation device 15 furthermore is arranged in the cylinder head cover 5. It is clear that the crankcase ventilation device 12 in the usual manner can comprise components such as for example non-return stop valves, throttling points, switching valves etc. The crankcase ventilation device 12 operates as follows:

During the operation of the internal combustion engine 1 so-called blow-by gas enters the crankcase 3 via leakages of the pistons in the cylinders. In the process, the blow-by gas can already carry with it soot particles and oil particles. However, in the crankcase 3 at the latest a further admixing of oil mist to the blow-by gas occurs. The blow-by gas contaminated with particles enters the cylinder head cover 5 as contaminated blow-by gas stream through the cylinder head 4 according to an arrow 16. In the cylinder head cover 5, the contaminated blow-by gas is cleaned of the carried-along particles with the help of the separation device 15 so that according to an arrow 17 cleaned blow-by gas out of the cylinder head cover 5 reaches the fresh air system 8 via the return line 14. The cleaned particles can for example be returned to the crankcase 3 according to an arrow 18 drawn with dashed line.

According to FIGS. 1 to 4, the separation device 15 comprises a raw chamber 19, which the contaminated gas 16 enters, and a clean chamber 20, out of which the cleaned gas 17 exits. Furthermore, a dividing wall 21 is provided which divides the raw chamber 19 from the clean chamber 20 and which comprises a perforation region 22 with multiple passage openings 23, through which the gas can flow from the raw chamber 19 into the clean chamber 20. Corresponding passage openings are indicated in FIG. 1 by arrows 24.

In the preferred embodiment shown in FIG. 1, the separation device 15 is integrated in the cylinder head cover 5 in the form of a blow-by gas cleaning device. To this end, a cover body 25 of the cylinder head cover 5 comprises at least one part of the raw chamber 19 and at least one part of the clean chamber 20. Furthermore, the dividing wall 21 is formed on this cover body 25.

The separation device 15 additionally comprises a gas-permeable separation structure 26, which is arranged on a wall outlet side 27 of the dividing wall 21 facing the clean chamber 20 and in the process completely covers the perforated region 22. The separation structure 26 can be produced for example with the help of a fibre fleece material. It is designed so that when it is subjected to a through-flow it separates particles carried along out of the gas flow. This separation structure 26 is fastened to the dividing wall 21. Preferably, the separation structure 26 is exclusively fastened to the dividing wall 21. The separation structure 26 furthermore is arranged in the clean chamber 20 in a largely freestanding manner. Preferably, it is arranged with a structure outlet side 28 facing away from the dividing wall 21 in the clean chamber 20 in a freestanding manner. As is evident from FIG. 1, no baffle wall is arranged in the clean chamber 20 on a structure outlet side 28 of the separation structure 26 facing away from the dividing wall 21. A wall of the cover body 25 bounding the clean chamber 20 towards the outside in this case does not form a baffle wall arranged in the clean chamber 20 when it is spaced, as in FIG. 1, from the separation structure 26 in the through-flow direction 24, e.g. by at least one or two or five wall thicknesses of the separation structure 26.

Practically, the separation structure 26 is welded to the dividing wall 21. According to the FIGS. 2 to 4, the dividing wall 21 comprises multiple welding ribs 29. These project from the dividing wall 21 on their wall outlet side 27 in the direction of the clean chamber 20 and because of this have freestanding face ends 30. These face ends 30 can be utilised in particular for forming welding zones, for example in order to fix the separation structure 26 by friction welding or ultrasound welding or by plasticising or by an NIR method on the welding ribs 29. According to the FIGS. 2 and 3, the welding ribs 29, in the assembled state, can dip into the separation structure 26 or project into the same. As is evident in particular from FIG. 3, a spacing 31 can be maintained between the face ends 30 of the welding ribs 29 and the structure outlet side 28, so that the welding ribs 29 do not penetrate the separation structure 26 but end in the interior of the separation structure 26.

Figure 2:
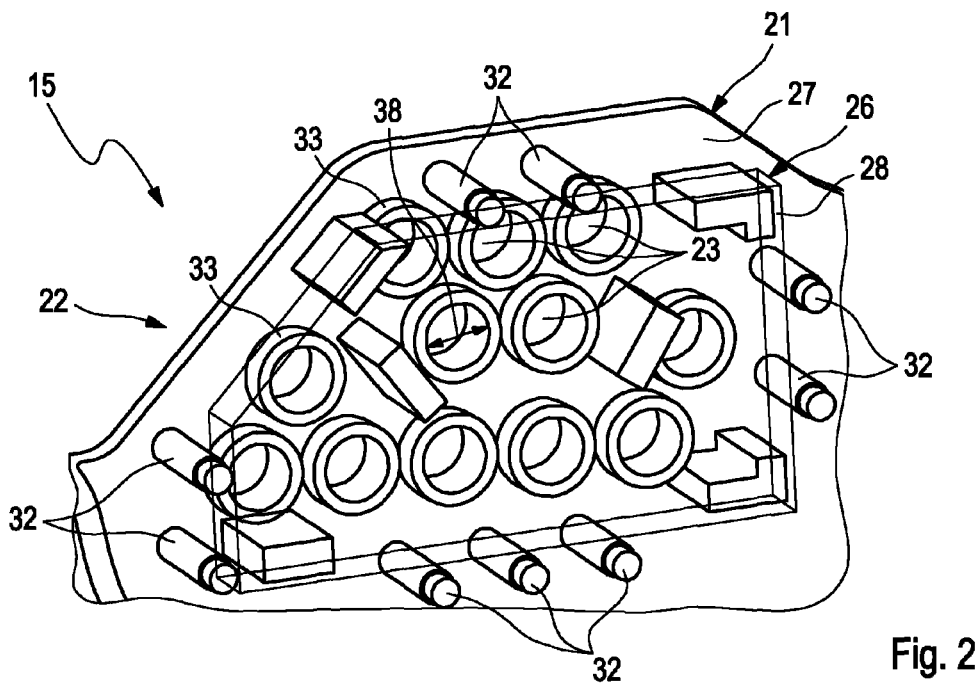
Figure 3:
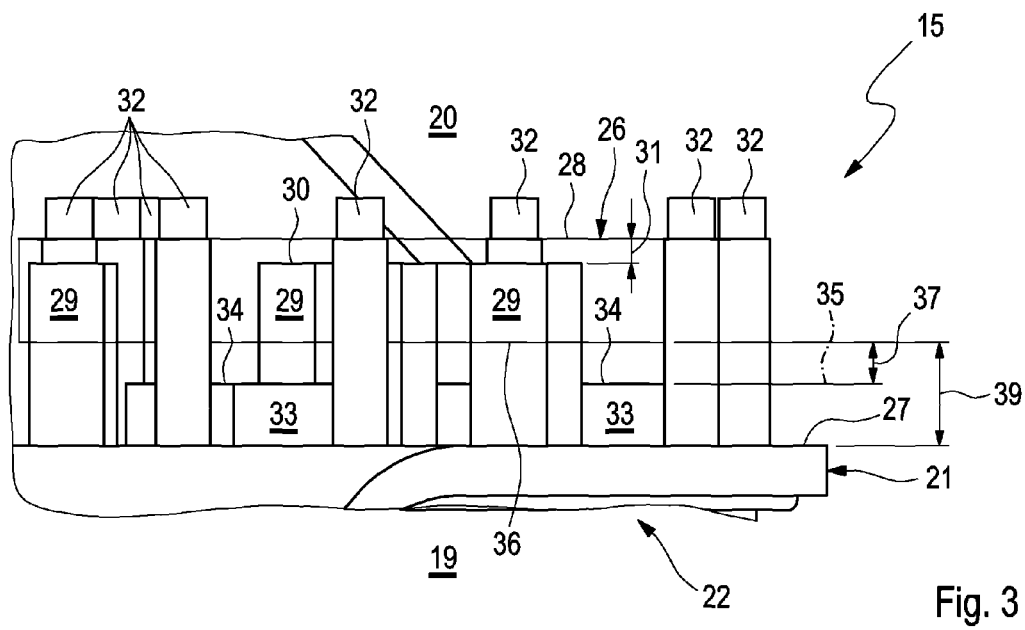
Figure 4:
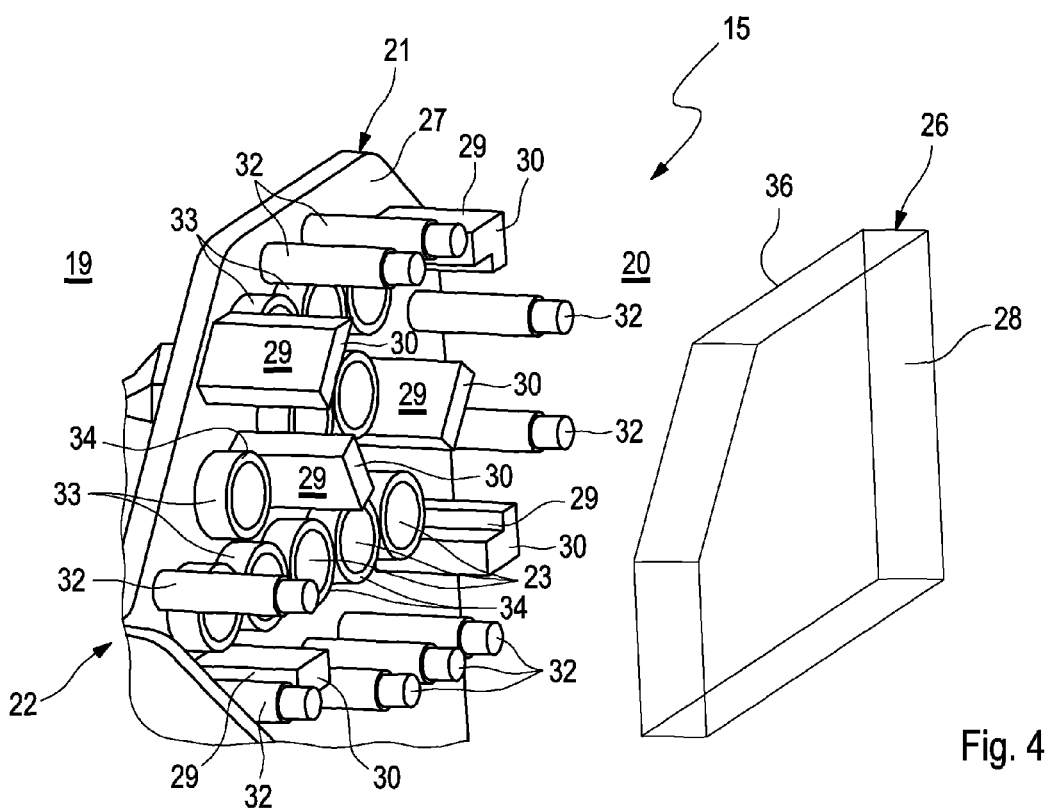

The dividing wall 21 according to FIGS. 2 to 4 preferentially comprises multiple guide elements 32, which are configured as pin-shaped elements here. The guide elements 32 laterally surround the perforated region 22. The guide elements 32 project from the dividing wall 21 on the wall outlet side 27 in the direction of the clean room 20. In the assembled state, the separation structure 26 is arranged between these guide elements 32.

As is further evident from the FIGS. 2 to 4, the passage openings 23 in the preferred embodiment shown here are each surrounded by a collar 33 on the wall outlet side 27. The respective collar 33 in this case is dimensioned so that it axially extends the respective passage opening 23. The collars 33 project from the dividing wall 21 on the wall outlet side 27 in the direction of the clean chamber 20 and accordingly comprise a freestanding face end 34 each. Practically, all collars 33 project from the wall outlet side 27 by the same spacing so that the face ends 34 of the collars 33 lie in a common face end plane 35.

As is evident in particular from FIG. 3, the separation structure 26 is arranged on the dividing wall 21 so that a structure inlet side 36 of the separation structure 26 facing the dividing wall 21 is spaced relative to the freestanding face ends 34 of the collars 33, i.e. has a spacing 37. This spacing 37 is preferentially smaller than a diameter 38 of the circular cross sections of the passage openings 23, which in this case have a constant cross section in their through-flow direction. Furthermore, a spacing 39 is additionally entered in FIG. 3 which is maintained between the wall outlet side 27 and the separation inlet side 36.

For an efficient separation effect of the separation structure 26 maintaining the spacing 37, which is present between the free face ends 34 of the collars 33 and the structure inlet side 36, within close tolerances is required. Since the separation structure 26 in the separation device 15 introduced here is fixed on the dividing wall 21 itself, namely via the welding ribs 29, maintaining close tolerances is comparatively easy to carry out.

The invention claimed is:

1. A separation device for separating a gas flow, comprising:
    a raw chamber receiving a contaminated gas,
    a clean chamber, out of which a treated gas exits,
    a dividing wall separating the raw chamber from the clean chamber, the dividing wall including a perforated region defining a plurality of passage openings, through which the gas flow communicates from the raw chamber into the clean chamber,
    a gas-permeable separation structure arranged on a wall outlet side of the dividing wall facing the clean chamber, wherein the separation structure separates contaminates from the gas flow when subjected to a through-flow;
    wherein the separation structure is secured to the dividing wall, the dividing wall including at least one welding rib to which the separation structure is welded;
    wherein the plurality of passage openings on the wall outlet side are each surrounded by a collar that projects from the dividing wall in a direction towards the clean chamber; and
    wherein a structure inlet side of the separation structure facing the dividing wall is spaced from a face end of the respective collars facing the separation structure.

2. The device according to claim 1, wherein the separation structure is exclusively secured to the dividing wall and isolated from a further component.

3. The device according to claim 1, wherein the separation structure is arranged free-standing in the clean chamber via the at least one welding rib.

4. The device according to claim 1, wherein a structure outlet side of the separation structure facing away from the dividing wall is arranged free-standing in the clean chamber.

5. The device according to claim 1, wherein the clean chamber is without a baffle wall on a structure outlet side of the separation structure facing away from the dividing wall.

6. The device according to claim 1, wherein the at least one welding rib projects into the separation structure.

7. The device according to claim 6, wherein the at least one welding rib does not penetrate the separation structure.

8. The device according to claim 1, wherein the dividing wall further includes a plurality of guide elements laterally surrounding the perforated region, and wherein the separation structure is arranged between the plurality of guide elements.

9. A crankcase ventilation device for an internal combustion engine, comprising:
- a blow-by gas path fluidically connecting a crankcase with a fresh air system, and
- at least one separation arranged in the blow-by gas path for separating contaminates from a gas flow, wherein the at least one separation device includes:
  - a raw chamber separated from a clean chamber by a dividing wall, the dividing wall including a perforated region defining a plurality of passage openings, through which the gas flow communicates from the raw chamber to the clean chamber; and
  - a gas-permeable separation structure arranged on a wall outlet side of the dividing wall facing the clean chamber for separating contaminates from the gas flow;
  - wherein the dividing wall includes at least one welding rib projecting towards the separation structure for securing the separation structure to the dividing wall
  - wherein the plurality of passage openings on the wall outlet side are each surrounded by a collar, which and each collar projects from the dividing wall in a direction towards the clean chamber; and
  - wherein a structure inlet side of the separation structure facing the dividing wall is spaced from a face end of the respective collars facing the separation structure.

10. A cylinder head cover for an internal combustion engine, comprising:
- a cover body and at least one separation device disposed in the cover body, the at least one separation device configured to separate contaminates from a gas flow and including:
  - a raw chamber receiving the contaminated gas separated from a clean chamber by a dividing wall, the dividing wall including a perforated region defining a plurality of passage openings through which the gas flow communicates from the raw chamber to the clean chamber;
  - a gas-permeable separation structure arranged on a wall outlet side of the dividing wall facing the clean chamber, wherein the separation structure separates the contaminates from the gas flow;
  - wherein the dividing wall includes at least one welding rib projecting towards the separation structure, the at least one welding rib securing the dividing wall to the separation structure, and wherein each of the plurality of passage openings on the wall outlet side of the dividing wall include a surrounding collar projecting from the dividing wall in a direction towards the clean chamber;
  - wherein the cover body defines at least partially the raw chamber the clean chamber, and
  - wherein the dividing wall is secured to the cover body.

11. The cylinder head cover according to claim 10, wherein the separation structure on a structure inlet side facing the dividing wall is spaced from a face end of the respective collars.

12. The cylinder head cover according to claim 10, wherein the at least one welding rib projects into the separation structure.

13. The cylinder head cover according to claim 10, wherein the dividing wall further includes a plurality of guide elements laterally surrounding the perforated region, and wherein the separation structure is arranged between the plurality of guide elements.

14. The cylinder head cover according to claim 10, wherein the separation structure is exclusively secured to the dividing wall via the at least one welding rib and is isolated from a further component.

15. The crankcase ventilation device according to claim 9, wherein the dividing wall further includes a plurality of guide elements laterally surrounding the perforated region, wherein the separation structure is arranged between the plurality of guide elements.

16. The crankcase ventilation device according to claim 9, wherein the separation structure is exclusively secured to the dividing wall via the at least one welding rib and is isolated from a further component.

17. The device according to claim 1, wherein the spacing is less than a diameter of the passage openings.

* * * * *